(12) United States Patent
Wetzker

(10) Patent No.: US 11,474,191 B2
(45) Date of Patent: Oct. 18, 2022

(54) METHOD FOR CONFIGURING A TRACKING SYSTEM, TRACKING SYSTEM, LIGHTING SYSTEM INCORPORATING A TRACKING SYSTEM AND COMPUTER PROGRAM

(71) Applicant: SIGNIFY HOLDING B.V., Eindhoven (NL)

(72) Inventor: Gunnar Wetzker, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/263,315

(22) PCT Filed: Jul. 16, 2019

(86) PCT No.: PCT/EP2019/069092
§ 371 (c)(1),
(2) Date: Jan. 26, 2021

(87) PCT Pub. No.: WO2020/020701
PCT Pub. Date: Jan. 30, 2020

(65) Prior Publication Data
US 2021/0149011 A1 May 20, 2021

(30) Foreign Application Priority Data
Jul. 26, 2018 (EP) ..................... 18185661

(51) Int. Cl.
*G01S 5/02* (2010.01)
*H04W 4/029* (2018.01)

(52) U.S. Cl.
CPC ........... *G01S 5/0252* (2013.01); *H04W 4/029* (2018.02)

(58) Field of Classification Search
CPC ............................. G01S 5/0252; H04W 4/029
(Continued)

(56) References Cited

U.S. PATENT DOCUMENTS 9,179,343 B2 11/2015 Yang et al.
9,215,685 B2 12/2015 Gupta et al.
(Continued)

FOREIGN PATENT DOCUMENTS

EP 3092830 B2 2/2020
JP 2010197050 A 9/2010
(Continued)

OTHER PUBLICATIONS

Parisa Mohebbi, et al., "Sensor-Data Fusion for Multi-Person Indoor Location Estimation," Sensors, MDPI, Department of Computing Science, University of Alberta, Edmonton, Canada, 2017 (21 Pages).
(Continued)

*Primary Examiner* — Ted M Wang (57) ABSTRACT

A method is provided for configuring a tracking system which estimates a location within a space by comparison of measurements of RF signals, made at the location, with a radio fingerprint map of the space. Estimated locations are correlated with synchronised detections of presence of a user (30) by sensors of a lighting system. RF signal measurements made by a user at a given time may thereby be associated with a user (30) detected at the same time in one or more respective sensing areas of lighting system sensors. The user (30) making RF signal measurements at a determined location may thereby be associated with a user (30) detected by the lighting system sensors at the same time. The association may be used to configure the radio fingerprint map. The location of the detected user (30) as determined by the tracking system may be provided to the lighting system.

15 Claims, 3 Drawing Sheets

(58) Field of Classification Search
    USPC ...................................................... 455/456.1
    See application file for complete search history.

(56)           References Cited

U.S. PATENT DOCUMENTS 9,363,784 B1      6/2016  Friday et al.
    9,439,041 B2      9/2016  Parvizi et al.
 2014/0084165 A1      3/2014  Fadell et al.
 2016/0116343 A1*     4/2016  Dixon .................... G05B 15/02
                                                          250/342
 2018/0077533 A1      3/2018  Pandharipande et al.
 2018/0120410 A1      5/2018  Ivanov et al.
 2019/0285748 A1*     9/2019  DeVries .................. G01S 17/04

FOREIGN PATENT DOCUMENTS

JP        2014239044 A     12/2014
 JP        2016530685 A      9/2016
 WO        2014175738 A1    10/2014
 WO        2016064562 A2     4/2016
 WO        2017/213808 A1   12/2017

OTHER PUBLICATIONS

Mekuanint Agegnehu Bitew, et al., "Hybrid Indoor Human Localization System for Addressing the Issue of RSS Variation in Fingerprinting," International Journal of Distributed Sensor Networks, vol. 2015, 2014 (9 Pages).

* cited by examiner

METHOD FOR CONFIGURING A TRACKING SYSTEM, TRACKING SYSTEM, LIGHTING SYSTEM INCORPORATING A TRACKING SYSTEM AND COMPUTER PROGRAM

CROSS-REFERENCE TO PRIOR APPLICATIONS

This application is the U.S. National Phase application under 35 U.S.C. § 371 of International Application No. PCT/EP2019/069092, filed on Jul. 16, 2019, which claims the benefit of European Patent Application No. 18185661.8, filed on Jul. 26, 2018. These applications are hereby incorporated by reference herein.

TECHNICAL FIELD

The present disclosure relates to a lighting system, to a method for identifying detected users of a lighting system and a computer program.

BACKGROUND

Lighting systems, for example wireless lighting systems produced by the present Applicant under the hue® brand, employ sensors for detecting the presence of a user and for responding to that detected presence according to a user-defined configuration.

While such lighting systems include sensors able to detect the presence of a user within respective sensing areas, they are generally unable to determine with greater accuracy the location of a user of the lighting system.

Sensors are known to detect objects in interior spaces such as those disclosed in US2014/084165 A1 and WO2016/064562 A2.

EP3092830 A1 discloses an application server which provides a user of a mobile device with a location based service controlling functionality of an environment, such as a lighting system. A feedback module is configured to infer a quality of a location estimation from the behavior of the user, based on a manner in which the user interacts or attempts to interact with the functionality of the location based service.

US2018/120410 A1 discloses a method wherein measurements by a mobile device of radio signals transmitted by at least one transmitter are obtained. The results of measurements comprise characteristics of the radio signals at each of a plurality of locations of measurements at a particular measurements at a particular site, and indications of the locations of site, and indications of the locations of measurement. The results of measurement and the indications of the locations are provided and used as a basis for a generation of a radio map for use in supporting a positioning of mobile mobile devices at the site.

SUMMARY

It is an insight of the inventors that although presence sensors typically only flag presence or absence in a region, they may still be used to provide corrective input to an RF tracking system.

According to a first aspect disclosed herein, there is provided a computer-implemented method for configuring a tracking system arranged to determine a location within a space by comparison of one or more measurements of radio frequency (RF) signals, made at the location, with measurements of RF signals recorded in a radio fingerprint map of the space, the space being illuminated by a lighting system having one or more sensors for detecting the presence of a user of the lighting system in the space, each of the one or more sensors having a respective predetermined sensing area in the space, the method comprising:

(i) receiving measurements of radio frequency (RF) signals propagating in the space, each measurement being made at a respective time of measurement by a device, carried by a user, configured to measure RF signals;

(ii) receiving sensor data output by the one or more sensors of the lighting system, the sensor data indicating a presence, in one or more respective sensing areas within the space, of a detected user at a respective time of sensing, wherein at least one said time of measurement is synchronised with said time of sensing;

(iii) estimating respective locations of making RF signal measurements received at (i) by reference to a radio fingerprint map of the space;

(iv) correlating, in respect of a same said time, one of the locations estimated at (iii) of making the measurements of RF signals with the indicated detection, at (ii), of a user in the one or more respective sensing areas within the space thereby to associate a user carrying the device making the measurements of RF signals at the correlated one of the locations with the indicated detection; and (v) configuring the radio fingerprint map according to the association made at (iv).

Measurements of RF signals, made at locations determined with reference to a radio fingerprint map, may be correlated with detection of the presence of a user indicated in sensor data, synchronised with the RF signal measurements, output by the lighting system. In this way, a user carrying a device making the measurements of RF signals at a given time may be associated with the user whose presence was detected at that same time by the lighting system sensors in one or more respective sensing areas.

In this way, the location of the user detected by the lighting system may be determined. Furthermore, the associated detection of a user by the sensors of the lighting system may be used to configure the radio fingerprint map of the tracking system and so result in more accurate tracking and increased reliability of location determination for detected users of the lighting system.

When referring to registering measurements "at that same time" above, this ideally corresponds to simultaneous, or substantially simultaneous, however in embodiments "at the same time" is preferably within 0.5 second of one another, or more preferably within 0.1 second of one another. Given that movement within offices generally is at or below walking speed, which is approximately 1.4 m/s (5 km/h), the measurements need not be simultaneous; a 0.5 second time-difference would cause a 0.75 m error, whereas a 0.1 second time-difference would result in a 0.14 m error. It will be clear to those skilled in the art that the smaller the time-difference the more accurate the result.

In an example of the method, at (iv), the correlating comprises identifying one or more of the measurements of RF signals received at (i) for which the estimated location substantially corresponds with a location within the one or more respective sensing areas of the indicated detection at the same said time.

In an example of the method, at (v), the configuring comprises at least one of: updating location information stored in the fingerprint map for the respective measurement of RF signals using location information determined from the one or more respective sensing areas of the indicated detection; and adding a measurement of RF signals and a corresponding location determined from the one or more respective sensing areas of the indicated detection.

In an example of the method, at (i), the received measurements comprise measurements of at least one of: RF signal amplitude; RF signal frequency; RF signal content; and RF signal phase.

In an example of the method, at (i), each of the received measurements of RF signals include a respective time of measurement. This enables processing of the received measurements at some later time if required.

In an example of the method, (i) comprises receiving measurements of RF signals in real-time following measurement by the device and associating each received measurement, on receipt, with a respective time of measurement.

In an example of the method, at (iii), estimating respective locations comprises comparing relative values in the received measurements of RF signals with corresponding relative values represented in the radio fingerprint map of the space.

According to a second aspect disclosed herein, there is provided a tracking system, comprising an interface to a lighting system, the lighting system having one or more controllable light sources for illuminating a space and one or more sensors arranged to output sensor data indicative of the presence of a user detected in the space, each of the one or more sensors having a respective predetermined sensing area within the space, the tracker system being configured:
(i) to receive measurements of radio frequency (RF) signals propagating in the space, each measurement being made at a respective time of measurement by a device, carried by a user, configured to measure RF signals;
(ii) to receive sensor data output by the one or more sensors of the lighting system, the sensor data indicating a presence, in one or more respective sensing areas within the space, of a detected user at a time of sensing, wherein at least one said time of measurement is synchronised with said time of sensing;
(iii) to estimate respective locations of making RF signal measurements received at (i) by reference to a radio fingerprint map of the space;
(iv) to correlate in respect of a same said time, one of the locations estimated at (iii) of making the measurements of RF signals with the indicated detection, at (ii), of a user in the one or more respective sensing areas within the space thereby to associate a user carrying the device making the measurements of RF signals at the correlated one of the locations with the indicated detection; and
(v) to configure the radio fingerprint map according to an association made at (iv).

In an example of the tracking system, at (iv), the correlating comprises identifying one or more of the measurements of RF signals received at (i) for which the estimated location substantially corresponds with a location within the one or more respective sensing areas of the indicated detection at the same said time.

In an example of the tracking system, at (v), the configuring comprises at least one of: updating location information stored in the fingerprint map for the respective measurement of RF signals using location information determined from the one or more respective sensing areas of the indicated detection; and adding a measurement of RF signals and a corresponding location determined from the one or more respective sensing areas of the indicated detection.

In an example of the tracking system, at (i), the device configured to measure RF signals is configured to make measurements of at least one of: RF signal amplitude; RF signal frequency; RF signal content; and RF signal phase.

In an example of the tracking system, at (i), the device configured to measure RF signals comprises a mobile phone or other type of portable computing device configured, under the control of software executing on the device, to make the measurements of RF signals.

In an example of the tracking system, at (i), each of the received measurements of RF signals include a respective time of measurement.

In an example of the tracking system, at (iii), the tracking system is configured to estimate a respective location by comparing relative values of the received measurements of RF signals with corresponding relative values represented in the radio fingerprint map of the space.

According to a third aspect disclosed herein, there is provided a lighting system comprising one or more controllable light sources for illuminating a space and one or more sensors each having a respective sensing area within the space and each arranged to output sensor data indicative of the presence of a user detected in the space, the lighting system being configured to implement a tracking system to track users of the lighting system within the space, the tracking system being configured to determine a location of a user within the space by comparison of one or more measurements of radio frequency (RF) signals, made at the location, with measurements of RF signals recorded in a radio fingerprint map of the space, the lighting system being configured to configure the tracking system by implementing the method described above according to the first aspect disclosed herein.

According to a fourth aspect disclosed herein, there is provided a computer program comprising computer program code which when installed in and executed by a digital processor causes the digital processor to implement the method described above according to the first aspect disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

With increased deployment of wireless communications systems within buildings, in particular, tracking systems based upon radio frequency (RF) fingerprinting may be used to determine the location of people or their mobile terminal devices within a building. Wireless communications based upon the 802.11 wireless communications standard—Wi-Fi—or Bluetooth® are particularly suited to the generation of 'radio fingerprint maps' associating measured RF signal characteristics with location within a given space. Measurements of received RF signal characteristics by a portable device carried by a user, for example by the user's mobile phone or other portable computing device as the user moves through a space, enables the location of the user to be determined and tracked by determining where in the generated radio fingerprint map such a profile of changing signal characteristics occurs. Various techniques are known both for generating the radio fingerprint map, for configuring the radio fingerprint map and for determining a user's location and direction of travel by comparison of a profile of changing RF signal characteristics measured by the user's device with signal characteristics represented in the radio fingerprint map.

A lighting system, for example a wireless lighting system as supplied by the Applicant under the hue® product line, includes sensors able to detect the presence, in a defined sensing area for the sensor, of a user of the lighting system within in a space to be illuminated. Lighting systems arranged to sense the presence of a user within a space to be illuminated are not generally configurable to be able to determine the location of a user within the space and to take the user's location into account when controlling luminaires of the lighting system. Known lighting systems are able to respond only to a detected presence or to movement by users in the vicinity of particular luminaires of the lighting system and to activate those luminaires according to a predetermined or user-specified configuration of the lighting system.

A wireless lighting system, such as that referred to above by the present Applicant, generates RF signals that may be used to enable or to supplement the implementation of a tracking system within the space being illuminated, based upon a radio fingerprint map of the space. According to the present disclosure, a technique is provided that enables both the lighting system and the tracking system to benefit from an exchange of data by the two systems when deployed within a common space, whether or not the RF signals generated by the lighting system are also exploited by the tracking system.

A wireless lighting system according to the present disclosure is arranged to interact with such a tracking system and to use information provided by the tracking system to determine the location of detected users of the lighting system.

Similarly, a tracking system according to the present disclosure is arranged to configure its radio fingerprinting map and so improve its tracking accuracy through access to sensor data output by the lighting system. If the lighting system is a wireless lighting system, the presence of additional RF signal sources in the space benefits the tracking system further, either in enabling a reduction in the number of RF sources that would otherwise be provided by tracking purposes, or to increase the diversity of RF signal sources in a space.

An example of a lighting system that may be used in combination with a tracking system based upon radio fingerprint maps will be described now with reference to FIG. 1. In this example, the lighting system is a wireless lighting system such as that referred to above by the present Applicant. However, it is not essential that the lighting system is a wireless lighting system, as will be apparent to a person of ordinary skill in the relevant art.

Figure 1:
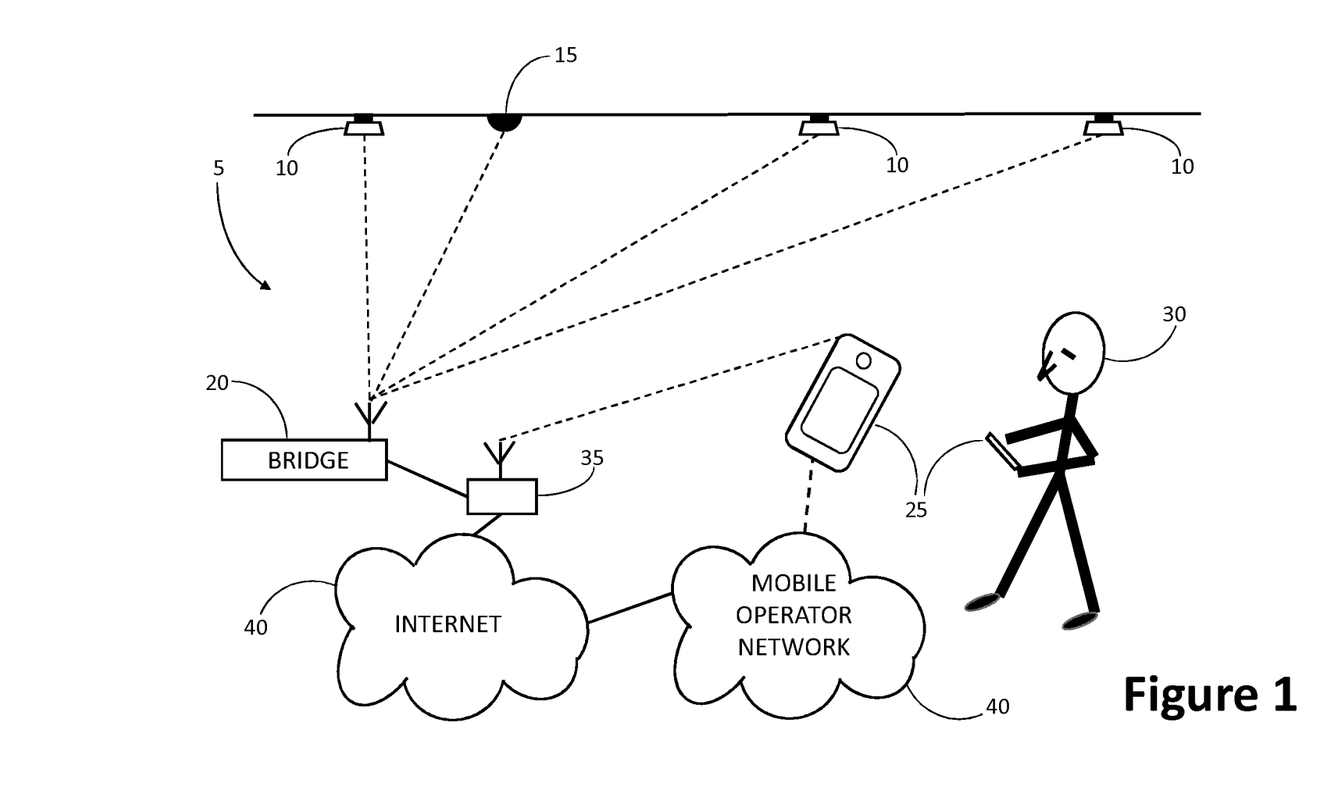
FIG. 1 shows components in an example of a wireless lighting system as may be arranged according to the present disclosure.

Referring to FIG. 1, a schematic representation is provided of components of a wireless lighting system 5. One or more light sources 10—'luminaires'—are mounted for example on a ceiling or other support within a space to provide illumination over respective areas of the space. One or more of the luminaires 10 may incorporate a passive infra-red (PIR) or other type of movement sensor to detect the presence of a user within the space. Alternatively, or in addition, one or more separate PIR sensors 15 or other type of movement sensor may be mounted to sense the presence of a user. Each sensor of the lighting system has a defined sensing area within the space. The sensing area for each sensor may be determined for example by one or more of: reference to sensor specifications; during commissioning, by routine experiment; and by use of various crowdsourcing techniques whereby users indicate respective positions at which a particular luminaire is triggered, the indicated positions, when stored, defining the sensing area of a respective sensor or combination of sensors.

Each of the luminaires 10 and PIR sensors 15 incorporates a wireless transceiver to enable communication with a bridge device 20. The bridge device 20 implements functionality for secure communication with the luminaires 10 and PIR sensors 15 to apply various pre-configured and user-configurable control functions. The bridge device 20 is also configured to exchange configuration and control messages with mobile phones or other computing devices 25 of users 30 of the lighting system 5.

Software executing on a user's mobile phone or other computing device 25 enables the user 30 to configure and control the lighting system 5 by communication with the bridge device 20. The software may for example access and display to the user a floor plan of the space and indicate the positions of the luminaires 10 on the floor plan. With this information, the user may configure particular luminaires 10 either on the basis of their relative position to the user, while actually located in the space, or based upon a simulated presence of the user in the space.

The bridge device 20 is linked to the Internet 40 via a router 35. The bridge device 20 may be linked to the router 35 by a wired connection, e.g. Ethernet®, or by a wireless connection, e.g. a local Wi-Fi network. The router 35 communicates messages to and from users' mobile devices 25 via the Internet 40 and a respective mobile operator's network 45. Alternatively, user's mobile devices 25 may communicate wirelessly with the bridge device 20, e.g. via a Wi-Fi network within the space, or by a Bluetooth® connection.

However, each of the luminaires 10 and PIR sensors 15 may alternatively incorporate some or all of the functionality that may otherwise by implemented by the bridge device 20. In this way, user devices 25 may communicate directly with luminaires 10 to control the lighting system, via the Internet 40 or by wireless communication within the space, e.g. via a local Wi-Fi network or by Bluetooth.

According to the present disclosure, others types of lighting system may also be used in combination with a tracking system based upon radio fingerprint maps. For example, lighting systems having one or more luminaires 10 and sensors 15 linked to a bridge device using only wired connections would be equally suited to application of embodiments of the present invention.

An example arrangement of devices of a wireless lighting system and their use in combination with a tracking system referred to above will be described now with reference to FIG. 2. In this example, those components of the lighting system shown in FIG. 1 will be labelled with the same reference numerals when used also in the arrangement shown in FIG. 2.

Figure 2:
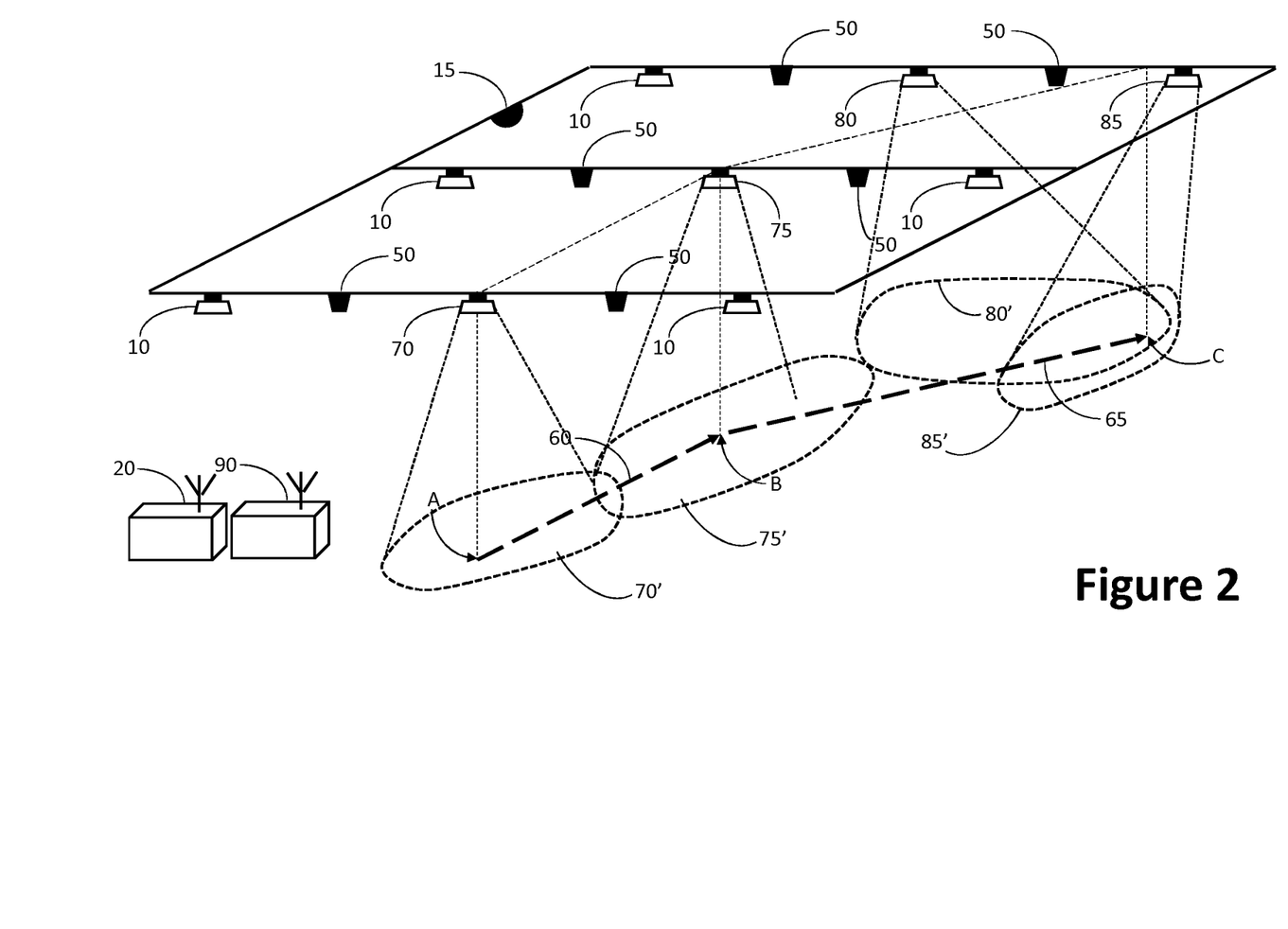
FIG. 2 shows components in an example of a wireless lighting system according to the present disclosure.

Referring to FIG. 2, an example of a wireless lighting system for illuminating a space is shown in a schematic representation based upon components of the lighting system of FIG. 1. The wireless lighting system includes luminaires 10, one or more of which have an in-built PIR sensor, a separate PIR sensor 15 and a bridge device 20. Also shown in FIG. 2 is an arrangement of Bluetooth transceivers 50. The Bluetooth transceivers may be used by the lighting system for communication within the space or they may be used within the space for other purposes. The Bluetooth transceivers do however provide a source of RF signals for use by a tracking system as referred to above.

A user 30, carrying a device 25 that is capable of measuring one or more characteristics of received RF signals, moves through the space from a location A along a path 60 to a location B and, then, along a path 65 to a location C. In this example, the location A is substantially beneath a luminaire 70 within a sensing area 70' of a presence sensor incorporated within the luminaire 70. The location B is substantially below a luminaire 75 within a sensing area 75' of a presence sensor incorporated within the luminaire 75. The location C is beneath a point somewhere between a luminaire 80 and a luminaire 85 within the sensing areas 80', 85' of sensors incorporated within the luminaires 80, 85 respectively. If it is assumed that each of the luminaires 70, 75, 80, 85 incorporates a PIR sensor, then sensor data output by the sensors in the luminaires 70-85 indicate the changing location of the user 30 moving along the paths 60, 65.

The device capable of measuring one or more characteristics of received RF signals may comprise a dedicated RF signal measuring device. Alternatively, the measuring device may comprise the user's mobile phone or other portable computing device 25, configured by software executing on the device to measure the one or more characteristics of received RF signals. The one or more characteristics may comprise at least one of: RF signal amplitude; RF signal frequency; RF signal content; and RF signal phase. The measuring device, e.g. a mobile phone or other portable computing device 25, may be configured, e.g. by the executing software, to record a time of each RF signal measurement. The device 25 may also be configured by the executing software to transmit data including the one or more measured RF signal characteristics for receipt by a tracking system controller 90. The transmitted data may include timing information, if recorded by the device 25. The transmitted data may also include an identifier for the device 25. The device 25 may for example transmit data in real-time such that the receiving controller 90 may record a time of receipt of the data with only a small delay over the actual time of the measurement. Alternatively, a record of the measurements made by the device 25 and of the time of each measurement may be made available to the controller 90 for later processing.

The tracking system controller 90 is provided to implement a tracking algorithm for tracking the location of a user carrying a device 25 making RF signal measurements as the user moves around the space. The tracking algorithm determines a location of a user's measuring device 25 on the basis of measurements received from the measuring device 25 of the one or more characteristics of an RF signal. The tracking algorithm determines a location at which signals having the one or more characteristics would be expected to be found by reference to a radio fingerprint map that has been generated for the space. The RF signal measurements may include measurement or one or more characteristics of signals over one or more of frequency ranges of RF signals expected within the space, in this example of Wi-Fi and Bluetooth signals.

Software associated with functions of the tracking system, in particular for measuring RF signals and communicating data to the controller 90 as described above, may be installed and executed on some or all mobile phone or portable computing devices 25 of users 30 of the lighting system. The same devices 25 may optionally be used both for configuring and interacting with the lighting system and for measuring RF signals for the tracking system. The tracking system software may cause the user's mobile device 25 to make the measurements of one or more RF signal characteristics at determined times or at predetermined time intervals synchronised with the times at which sensors of the lighting system output data indicative of the presence of users in respective sensing areas 70'-85' within the space.

The tracking system controller 90 may also have an interface to the wireless lighting system bridge device 20 to receive PIR sensor data from components 10, 15 of the lighting system, in real-time. Alternatively, the lighting system may output a respective time at which the sensors generate data so that the measuring device 25 and tracking system controller 90 may make or select RF signal measurements in respect of the same times. The received PIR sensor data may indicate which of the components 10, 15 of the lighting system is generating the received PIR sensor data. The controller 90 may also be configured with information defining the sensing areas 70'-85' within the space of sensors of the lighting system. The tracking system controller 90 is thereby arranged with access to the RF signal measurements made by an identified user device 25 at one or more times, PIR sensor data output from PIR sensors associated with identified components 10, 15 of the lighting system at the one or more times and a knowledge of the respective sensing areas 70'-85' within the space.

It is an insight of the inventors of the present invention that although the resolution of the presence detection is limited to a presence being detected and or no presence being detected, situations where presence can be detected may provide information as to the location of a person, in particular when that person is moving along a path 60, 65 as depicted in FIG. 2.

When a person moves into an area where the sensing areas of two presence sensors overlap, such as 70' and 75', this provides an accurate position of the person moving. As a result, by synchronizing the measurements, e.g. by performing an RF measurement when a presence sensor is triggered, two substantially simultaneous measurements can be linked, providing a "ground-truth" reference for calibrating the RF measurement. In fact it may be beneficial to purposefully create such small regions of overlap to further accommodate "calibration".

When there is more substantial overlap between the two presence sensors' detection/sensing area, such as for 80' and 85', accurate positioning may not be possible. However, it is possible in this case to extrapolate the position of the person carrying the mobile device 25 based on RF measurements. When the person is moving along the path 65 from B to C, the RF localization can determine an approximate position of the person assuming the person moves continuously along the path 65 in a linear fashion (or the path that is normally used in this location). Based on this path the system may determine when it is expected that the person will enter into the detection detection/sensing area 85'. If the person enters into the detection/sensing area 85' sooner (or later as the case may be) this can be indicative of an error in the RF positioning algorithm. If this error is structural, i.e. occurs amongst multiple users/multiple times, this may be a reason to correct for it.

When the presence detector 85 toggles, this signals that the person has crossed the boundary of the detection/sensing area 85' along the path. The toggling of the presence sensor may be used to trigger an RF measurement, if properly configured this should correspond to the point where the (extrapolated) path from the RF tracking system intersects the detection/sensing area 85'. As a result, when both measurements are in line this corroborates that the RF localization is well calibrated. If erroneous, then the fact that the sensing area 85' was entered unexpectedly early or late may be used to determine an error component as will be described next.

A path-based assessment may also be performed outside of regions of overlap. For example, when the person walks from B to C, the person will at one point leave detection/sensing area 75' and will thereafter enter detection area 80'. The tracking system may establish, based on the RF measurements made and movement extrapolated therefrom, the moment that the user will enter sensing area 80'. If this coincides with the toggling of the detection of presence in sensing area 80', this confirms the accuracy of the RF sensing. However, if this happens earlier, then the user progressed further along the path than the RF fingerprint position determination established. Based on the difference in time of this event and the speed of travel along the path (which might be established through periodic RF measurements and subsequent determination of the speed of travel between two successive locations) an error can be established, which when structural, may be corrected for in the RF position determination algorithm.

As the speed of movement in offices is generally about 1.4 m/s which is approximately 5 km/h, it may be possible to synchronize the RF measurements with presence detection, by triggering the actual RF measurement based on a presence detection. Measurements within 0.1 s of the trigger would allow for an error below 20 cm, which would generally be acceptable. Alternatively, when RF measurements are performed in a network centric approach, a measurement frequency of 10 times per second would not be objectionable and would result in similar accuracy. Hybrid approaches where the measurement frequency is lower, but which is combined with the above triggering may also be advantageous.

It should be noted that presence sensors may have a hysteresis built-in, for instance it is not uncommon for motion-based presence sensors to have a hysteresis. The hysteresis prevents the light from switching off when a user is in the room, but remains motionless for short periods. Such sensors would flag presence immediately upon detection, but do not flag absence of presence immediately. In cases like this it is beneficial to utilize the transition from no-presence detected to presence-detected only. However, if the hysteresis is implemented in software centrally, and the actual presence/no-presence signal is available then also the transition from presence-detected to no-presence detected may be used.

The tracking system controller 90 may be configured to operate according to a process as will now be described with reference to FIG. 3.

Figure 3:
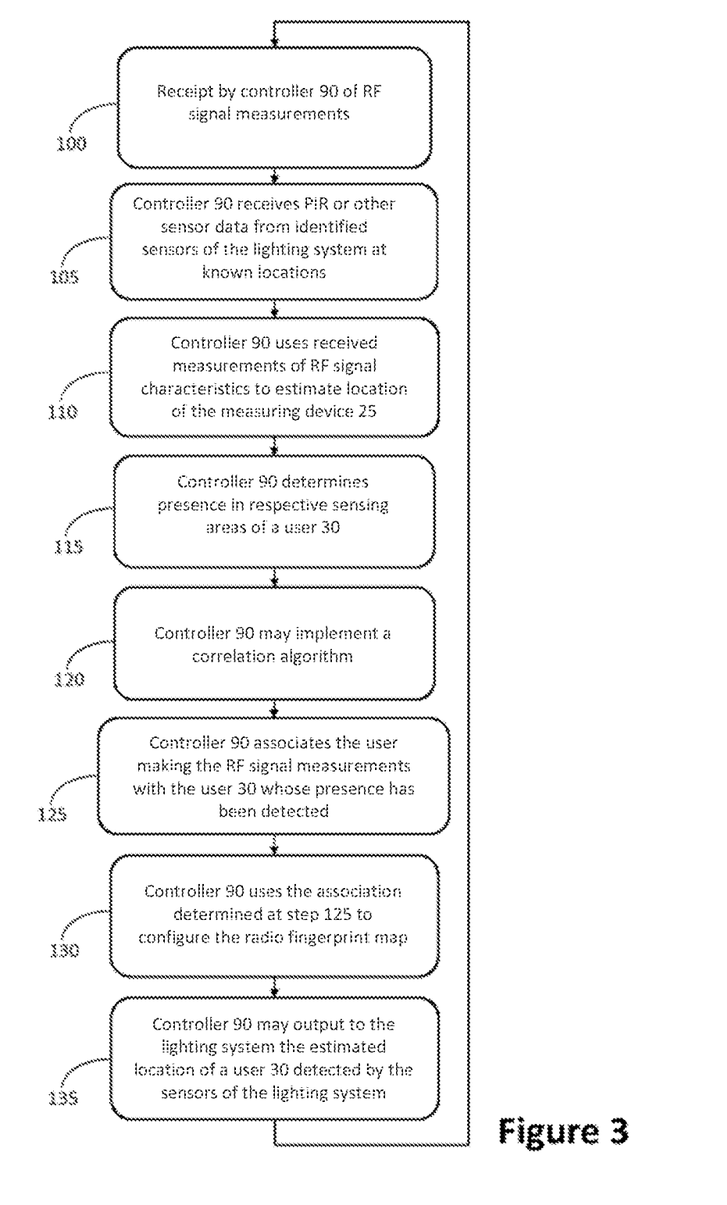
FIG. 3 is a flow diagram for a process as may be implemented in an example of a tracking system for use with a wireless lighting system according to the present disclosure.

Referring to FIG. 3, a flow chart is provided showing a process as may be implemented, in one example embodiment, by the tracking system controller 90. Alternative embodiments may be implemented in which, for example, the bridge device 20 of the lighting system may implement some or all of the process of FIG. 3. In a further alternative, some or all of the functionality of the tracking system controller 90 may be implemented by a user's mobile phone or other type of portable computing device 25.

The process begins at 100 with receipt by the controller 90 of RF signal measurements, as discussed above, transmitted or otherwise made available by an identifiable measuring device 25 such as a mobile phone or other portable computing device 25 as it moves through the space. Each received RF signal measurement includes a determined time of measurement, as discussed above. Alternatively, the controller 90 determines a time of receipt of each RF signal measurement. The controller 90 stores the received RF signal measurements, an identifier for the respective measuring device 25 and the determined timing in a database accessible to the controller 90.

At 105, the controller 90 receives PIR or other type of sensor data from identified sensors of the lighting system at known locations, provided for example by the lighting system bridge device 20. The sensor data indicate detected presence or movement of one or more users as they move through respective defined sensing areas 70'-85' within the space. The lighting system includes a sufficient density of sensors such that sensor data output by various selected combinations of sensors at a determined time may be used in detecting the changing location of a user within the space to a required degree of accuracy. The sensor data may be supplied by the lighting system in real-time. Alternatively, either the sensors themselves or the lighting system bridge device 20 may provide a time of output of the sensor data by each sensor. Alternatively, the controller 90 may record a time of receipt the sensor signals forwarded from the respective sensors in real-time. The controller 90 stores the received sensor data, an identifier for the sensor outputting the sensor data and determined timing data in a store accessible to the controller 90.

At 110, the controller 90 uses the received measurements of one or more RF signal characteristics by an identified measuring device 25 to estimate, by reference to a radio fingerprint map stored in a store accessible to the controller 90, the location of the measuring device 25 at one or more of the determined times of measurement as it moves through the space, e.g. along a path 60, 65. In making the estimation of location, the controller 90 may calculate relative values of the one or more RF signal characteristics over a time interval and may use the relative values as well as, or in preference to, the actual measured values of the one or more characteristics when making reference to the stored radio fingerprint map. In a further variant, corrections may be made to measurements of the one or more RF signal characteristics to account for free space signal attenuation, phase differences or other effects on RF signals propagating in the space. By these techniques, the estimate of location of a measuring device 25 may be made more tolerant of signal attenuation and other effects within a space due for example to a user carrying a measuring device 25 in a bag while it makes RF signal measurements. The estimate of location may also be tolerant of certain changes to RF signal characteristics at a location as may have occurred since the time that measurements were previously made at that location and stored in the radio fingerprint map. For example, placing a new metal filing cabinet or other large metallic object in the space might affect the absolute values of RF signal characteristics, but not necessarily affect the profile of change in values— the relative values—of those characteristics across a particular region in the vicinity of the object.

At 115, the controller 90 determines, from the received sensor data, applied in various combinations from identified sensors output at a determined time, the presence in respective sensing areas of a user 30, whether static or moving through the space. The controller 90 may also use the received sensor data to determine a path 60, 65 along which the detected user 30 is moving, according to a sequence of detection of a user 30 in the sensing areas 70'-85' of a particular sensors and the timings of detection. In the example shown in FIG. 2, the sensor data are likely to comprise various combinations of sensor data output from sensors associated with the luminaires 70, 75, 80 and 85 and potentially other sensors within sensing range of the user 30.

At 120, having determined an estimated location of a measuring device 25 at one or more of the determined times and having determined the presence of a detected user 30 in one or more respective sensing areas 70'-85' at the same one or more of the determined times, the controller 90 may implement a correlation algorithm to correlate an estimated location of measurement of RF signals with detection by the lighting system sensors of a user 30 in one or more respective sensing areas 70'-85' within the space at the same one or more of the determined times.

If required, the correlation algorithm may attempt to determine trajectories of movement of users detected by the lighting system sensors and of measuring devices 25 over a time interval and to correlate a section of a trajectory of a detected user with a corresponding section of a trajectory followed by a particular measuring device 25. Such a technique may increase the tolerance of the process to detection of movement of more than one user following a similar trajectory for a short section of a path through the space. However, the chances of detecting more than one user moving at the same time may be reduced, for the purposes of refining the radio fingerprint map, by selecting particular times of day for performing this process when fewer users are likely to be present in the space.

At 125, the controller 90 associates, on the basis of a correlation of an estimated location of RF signal measurement with the detected presence of a user 30 at the same time, the user making the RF signal measurements at the estimated location with the user 30 whose presence has been detected in one or more respective sensing areas 70'-85'.

At 130, the controller 90 uses the association determined at 125 to configure the radio fingerprint map. Configuration of the radio fingerprint map may comprise one or more of: adding new RF signal measurements for previously unrepresented locations in the space, including an estimate of location of measurement determined from the detected presence of the user making the measurement in one or more respective sensing areas of the lighting system sensors; determining that correctly recorded RF signal measurements are associated with the wrong location and so making a correction to the recorded location using the estimate of location of measurement determined from the detected presence of the user making the measurement in one or more respective sensing areas of the lighting system sensors; or correcting the RF signal measurements recorded in respect of the determined location.

At 135, the controller 90 may output to the lighting system the estimated location of a user 30 detected by the sensors of the lighting system. In this way, the wireless lighting system benefits by being able to respond to the presence of identified users of the lighting system at particular locations, providing more secure personal control over the response of particular luminaires 10 to the presence of users of the lighting system. From a security standpoint, it may be decided that a user should only be able to use their mobile phone or other portable computing device 25 to switch luminaires 70, 75, 80, 85 in the vicinity of the user and not elsewhere in the space. This is enabled by knowing where the user was located at the time of attempting to switch the luminaires 70, 75, 80, 85.

The data stores accessible to the tracking system controller 90 may be physically co-located with a tracking system processor of the controller 90, or provided as a cloud-hosted or other remotely hosted data store accessible to the controller, over the Internet 40 for example.

Further advantages of this process include:
automatic calibration and refinement of a radio fingerprint map during normal operation of an associated lighting system with gradual improvement in location tracking for the benefit of the lighting system and other systems interfacing with the tracking system;
the tracking system benefits from a greater number of RF signal sources than might otherwise have been provided solely for the purposes of tracking, or benefits from having to install a smaller number of dedicated RF signal sources, so increasing the coverage and potentially also the tracking accuracy of the tracking system.

Whereas the processes described above have been based upon RF signal measurements and PIR sensor data, data from other types of sensor, such as cameras, may be used to detect the presence and direction of movement of users of the lighting system moving through the space.

Other variations to the disclosed embodiments may be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for configuring a tracking system arranged to determine a location within a space by comparison of one or more measurements of radio frequency (RF) signals, made at the location, with measurements of RF signals recorded in a radio fingerprint map of the space, the space being illuminated by a lighting system having one or more sensors for detecting the presence of a detected user of the lighting system in the space, each of the one or more sensors having a respective predetermined sensing area in the space, the method comprising:
(i) receiving measurements of radio frequency (RF) signals propagating in the space, each measurement being made at a respective time of measurement by a device, carried by a device user, configured to measure RF signals;
(ii) receiving sensor data output by the one or more sensors of the lighting system, the sensor data indicating a presence, in one or more respective sensing areas within the space, of the detected user at a respective time of sensing, wherein at least one said time of measurement is synchronised with said time of sensing;
(iii) estimating respective locations of making RF signal measurements received at (i) by reference to a radio fingerprint map of the space;
(iv) correlating, in respect of a same said time, one of the locations estimated at (iii) of making the measurements of RF signals with the indicated detection, at (ii), of the detected user in the one or more respective sensing areas within the space thereby to associate the device user carrying the device making the measurements of RF signals at the correlated one of the locations with the indicated detection; and (v) configuring the radio fingerprint map according to the association made at (iv).

2. The method according to claim 1, wherein, at (iv), the correlating comprises identifying one or more of the measurements of RF signals received at (i) for which the estimated location substantially corresponds with a location within the one or more respective sensing areas of the indicated detection at the same said time.

3. The method according to claim 1, wherein, at (v), the configuring comprises at least one of: updating location information stored in the fingerprint map for the respective measurement of RF signals using location information determined from the one or more respective sensing areas of the indicated detection; and adding a measurement of RF signals and a corresponding location determined from the one or more respective sensing areas of the indicated detection.

4. The method according to claim 1, wherein, at (i), the received measurements comprise measurements of at least one of: RF signal amplitude; RF signal frequency; RF signal content; and RF signal phase.

5. The method according to claim 1, wherein, at (i), each of the received measurements of RF signals include a respective time of measurement.

6. The method according to claim 1, wherein (i) comprises receiving measurements of RF signals in real-time following measurement by the device and associating each received measurement, on receipt, with a respective time of measurement.

7. The method according to claim 1, wherein, at (iii), estimating respective locations comprises comparing relative values in the received measurements of RF signals with corresponding relative values represented in the radio fingerprint map of the space.

8. A tracking system, comprising an interface to a lighting system, the lighting system having one or more controllable light sources for illuminating a space and one or more sensors arranged to output sensor data indicative of the presence of a detected user detected in the space, each of the one or more sensors having a respective predetermined sensing area within the space, the tracker system being configured:

(i) to receive measurements of radio frequency (RF) signals propagating in the space, each measurement being made at a respective time of measurement by a device, carried by a device user, configured to measure RF signals;

(ii) to receive sensor data output by the one or more sensors of the lighting system, the sensor data indicating a presence, in one or more respective sensing areas within the space, of the detected user at a time of sensing, wherein at least one said time of measurement is synchronised with said time of sensing;

(iii) to estimate respective locations of making RF signal measurements received at (i) by reference to a radio fingerprint map of the space;

(iv) to correlate in respect of a same said time, one of the locations estimated at (iii) of making the measurements of RF signals with the indicated detection, at (ii), of the detected user in the one or more respective sensing areas within the space thereby to associate the device user carrying the device making the measurements of RF signals at the correlated one of the estimated locations with the indicated detection; and (v) to configure the radio fingerprint map according to an association made at (iv).

9. The tracking system according to claim 8, wherein, at (iv), the correlating comprises identifying one or more of the measurements of RF signals received at (i) for which the estimated location substantially corresponds with a location within the one or more respective sensing areas of the indicated detection at the same said time.

10. The tracking system according to claim 8, wherein, at (v), the configuring comprises at least one of: updating location information stored in the fingerprint map for the respective measurement of RF signals using location information determined from the one or more respective sensing areas of the indicated detection; and adding a measurement of RF signals and a corresponding location determined from the one or more respective sensing areas of the indicated detection.

11. The tracking system according to claim 8, wherein, at (i), the device configured to measure RF signals is configured to make measurements of at least one of: RF signal amplitude; RF signal frequency; RF signal content; and RF signal phase.

12. The tracking system according to claim 8, wherein, at (i), the device configured to measure RF signals comprises a mobile phone or other type of portable computing device configured, under the control of software executing on the device, to make the measurements of RF signals.

13. The tracking system according to claim 8, wherein, at (iii), the tracking system is configured to estimate a respective location by comparing relative values of the received measurements of RF signals with corresponding relative values represented in the radio fingerprint map of the space.

14. A non-transitory computer-readable medium on which are stored a plurality of non-transitory computer-readable instructions that, when executed on a processor, configure a tracking system arranged to determine a location within a space by comparison of one or more measurements of radio frequency (RF) signals, made at the location, with measurements of RF signals recorded in a radio fingerprint map of the space, the space being illuminated by a lighting system having one or more sensors for detecting the presence of a detected user of the lighting system in the space, each of the one or more sensors having a respective predetermined sensing area in the space, the plurality of non-transitory computer-readable instructions when executed on the processor being configured to implement the steps of:

(i) receiving measurements of radio frequency (RF) signals propagating in the space, each measurement being made at a respective time of measurement by a device, carried by a device user, configured to measure RF signals;

(ii) receiving sensor data output by the one or more sensors of the lighting system, the sensor data indicating a presence, in one or more respective sensing areas within the space, of the detected user at a respective time of sensing, wherein at least one said time of measurement is synchronised with said time of sensing;

(iii) estimating respective locations of making RF signal measurements received at (i) by reference to a radio fingerprint map of the space;

(iv) correlating, in respect of a same said time, one of the locations estimated at (iii) of making the measurements of RF signals with the indicated detection, at (ii), of the detected user in the one or more respective sensing areas within the space thereby to associate the device user carrying the device making the measurements of RF signals at the correlated one of the locations with the indicated detection; and (v) configuring the radio fingerprint map according to the association made at (iv).

15. The non-transitory computer-readable medium according to claim 14, wherein, at (iv), the correlating comprises identifying one or more of the measurements of RF signals received at (i) for which the estimated location substantially corresponds with a location within the one or more respective sensing areas of the indicated detection at the same said time.

* * * * *